(12) United States Patent
Partanen et al.

(10) Patent No.: US 11,464,237 B2
(45) Date of Patent: Oct. 11, 2022

(54) PRODUCT AND PROCESS FOR ITS PREPARATION

(71) Applicant: VALIO LTD., Helsinki (FI)

(72) Inventors: Riitta Partanen, Helsinki (FI); Sara Vaskio, Espoo (FI)

(73) Assignee: VALIO LTD, Helsinki (FI)

( * ) Notice: Subject to any disclaimer, the term of this patent is extended or adjusted under 35 U.S.C. 154(b) by 125 days.

(21) Appl. No.: 16/467,629

(22) PCT Filed: Dec. 20, 2017

(86) PCT No.: PCT/FI2017/050918
§ 371 (c)(1),
(2) Date: Jun. 7, 2019

(87) PCT Pub. No.: WO2018/115586
PCT Pub. Date: Jun. 28, 2018

(65) Prior Publication Data
US 2020/0275673 A1 Sep. 3, 2020

(30) Foreign Application Priority Data
Dec. 21, 2016 (FI) .................................. 20166006

(51) Int. Cl.
*A23C 9/13* (2006.01)
*A23C 9/123* (2006.01)
*A23C 9/142* (2006.01)

(52) U.S. Cl.
CPC ............ *A23C 9/1307* (2013.01); *A23C 9/123* (2013.01); *A23C 9/1422* (2013.01)

(58) Field of Classification Search
CPC .............................. A23C 9/1307; A23C 9/123
USPC .......... 426/42, 490, 491, 492, 580, 583, 804
See application file for complete search history.

(56) References Cited

U.S. PATENT DOCUMENTS

| | | | |
|---|---|---|---|
| 4,956,186 | A | 9/1990 | Streiff et al. |
| 2004/0040448 | A1 | 3/2004 | Dunker et al. |
| 2005/0019471 | A1* | 1/2005 | Pernell |
| 2007/0178213 | A1* | 8/2007 | Ketchmark et al. |
| 2013/0196030 | A1 | 8/2013 | Criezis et al. |
| 2014/0017332 | A1* | 1/2014 | Tikanmaki et al. |

FOREIGN PATENT DOCUMENTS

| | | |
|---|---|---|
| CN | 102628022 A | 8/2012 |
| CN | 102802426 * | 11/2012 |
| CN | 102960446 | 3/2013 |
| EP | 1 061 811 | 8/2004 |
| EP | 2 957 180 | 12/2015 |

(Continued)

OTHER PUBLICATIONS

Yogurt in Nutrition, "How much sugar do you add in plain yogurts", pp. 1-4. www.yogurtinnutrition.com/much-sugar-add-plain-yogurts/. (Year: 2016).*

(Continued)

*Primary Examiner* — Helen F Heggestad
(74) *Attorney, Agent, or Firm* — Robert P. Michal, Esq.; Carter, DeLuca & Farrell LLP

(57) ABSTRACT

The invention relates to a low-sugar acidified product, preferably yogurt or quark, and to a process for its preparation, wherein a milk raw material having a lactose content in the range from about 0.6 weight-% to 2.5 weight-% is used as a starting material.

24 Claims, 1 Drawing Sheet

(56) References Cited

FOREIGN PATENT DOCUMENTS

| FR | 2 224 096 | | 10/1974 |
|---|---|---|---|
| RU | 2 441 390 | | 2/2012 |
| RU | 2013142573 A | | 3/2015 |
| WO | 2008/077071 | | 6/2008 |
| WO | 2008/136671 | | 11/2008 |
| WO | 2009/059267 | | 5/2009 |
| WO | WO2010/128207 | * | 11/2010 |
| WO | 2014/087054 | | 6/2014 |
| WO | 2015/008103 | | 1/2015 |

OTHER PUBLICATIONS

Office Action issued in RU Appln. No. 2019121704/10(042374) dated Apr. 10, 2020 (w/ translation).
Office Action issued in EP Appln. No. 17 825 562.6 dated Nov. 17, 2020.
Database GNPD [Online] MINTEL; Nov. 24, 2016 (Nov. 24, 2016), anonymous: "Strawberry Pomegranate Cultured Dairy Blend", XP0557 48765, retrieved from www.gnpd.com, Database accession No. 4440131.
Database GNPD [Online] MINTEL; Sep. 13, 2016 (Sep. 13, 2016), anonymous: "Strawberry Quark", XP0557 48773, retrieved from www.gnpd.com, Database accession No. 4271005.
International Search Report for PCT/FI2017/050918 dated Feb. 12, 2018, 6 pages.
Written Opinion of the ISA for PCT/FI2017/050918 dated Feb. 12, 2018, 7 pages.
Search Report for FI20166006 dated Jul. 3, 2017, 3 pages.
Alvarez et al., "Fermentation of concentrated skim-milk. Effects of different protein/lactose ratios obtained by ultrafiltration-diafiltration", Journal of the Science of Food and Agriculture, 1998, vol. 76, pp. 10-16.
Decision on Grant issued by the Federal Service for Intellectual Property (ROSPATENT) in relation to Russian Application No. 2019121704 dated Apr. 1, 2021 (9 pages) along with English language translation (6 pages).
Office Action issued in corresponding Chinese Application No. 201780076431.8 dated Aug. 3, 2022, together with English language translation (14 pages).

* cited by examiner

PRODUCT AND PROCESS FOR ITS PREPARATION

FIELD OF THE INVENTION

The invention relates to a low-sugar acidified product and to a process for its preparation. By means of the process of the invention, it is possible to reduce the sugar content of the product and to prepare it in a cost-effective manner.

BACKGROUND OF THE INVENTION

There are no completely sugar-free sour milk products, such as yogurts, in the market at this moment. There is a great interest in as well as a need and demand for low-sugar sour milk products by the nutritional recommendations, food specialists and consumers.

Publication WO 2015/008103 (Compagnie Gervais Danone) describes a process for preparing a fermented dairy product which has a reduced amount of lactose. The process comprises the steps of hydrolysing lactose and concentrating proteins and sugars with a filtration process, wherein fermentation of milk is performed after hydrolysis or after the filtration process.

It has now unexpectedly been found that it is possible to produce low-sugar acidified milk products from a milk raw material having a lactose content of about 0.6 weight-% to about 2.5 weight-%. The products have sweet taste. In addition, it was found that post-acidification of the product was limited. Further, the reduction of lactose in the composition does not slow down the fermentation kinetics. This is an important aspect as the sucrose can then be added after acidification via jam, for example, and not into fermentation. This gives maximal sweetness with least total sugar in the end product.

BRIEF DESCRIPTION OF THE INVENTION

The invention relates to a low-sugar acidified milk product, and to a process for its preparation. The invention provides for use a new process for producing low-sugar acidified milk products. The process is simple, economical and industrially applicable in large scale.

It has now been unexpectedly found that by using a milk raw material having lactose content of about 0.6 weight-% to about 2.5 weight-% in a conventional acidification process, it is possible to produce low sugar acidified milk products, such as yogurts, having an excellent taste and structure, in a simple and economical manner.

The process of the invention is suitable for the production of acidified low-sugar products having excellent taste and structure. By means of the invention, it is possible to reduce the total sugar content of the acidified product by at least 30% (by weight) without affecting the sweetness sensation.

The object of the invention is achieved with a product and process that are characterised by what is stated in the independent claims. Preferred embodiments of the invention are disclosed in the dependent claims.

Further aspects, specific embodiments, objects, details, and advantages of the invention are set forth in the following drawings, detailed description, and examples.

DETAILED DESCRIPTION OF THE INVENTION

Figure 1:
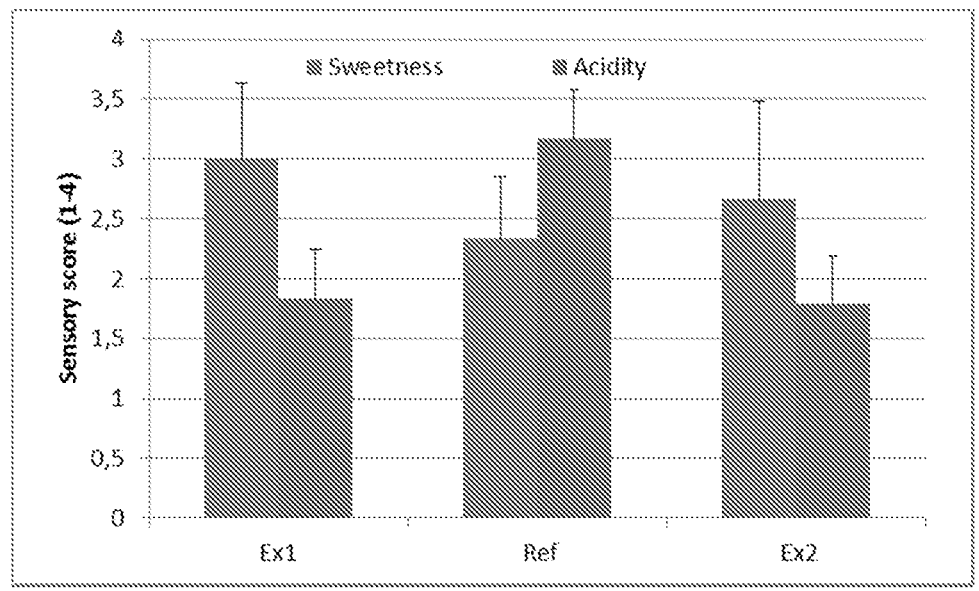
FIG. 1 show the sensory scores related to the sweetness and acidity of the yogurts of Examples 1 and 2.

The invention relates to a low-sugar acidified product, and to a process for its preparation. Typical adjectives describing low sugar acidified products, such as yogurts, in cases where the amount of added sugar is reduced or no sugar is added, are reduced sweetness, defects in aroma profile and excess acidity, for example. In cases where sweeteners are used, the products are characterised to have off-flavours and artificial taste. Accordingly, the present invention offers a solution for avoiding organoleptic as well as structural defects in low-sugar products, which have shown to be problematic. In addition, by means of the process of the invention, it is possible to reduce the acidity as well as post-acidification of the product since the sucrose is added only after acidification. Thus, the invention provides means for longer shelf-life for the products. Further, it was discovered that the reduction of lactose in the composition does not slow down the fermentation kinetics.

The present invention offers a new solution for the preparation of low-sugar acidified products, such as yogurt products by a process which comprises using a milk raw material having a lactose content of about 0.6 weight-% to about 2.5 weight-% in the process. In one embodiment, the milk raw material comprises about 0.6 weight-% to about 2.5 weight-% lactose. In one embodiment, the milk raw material comprises about 1.0 weight-% to about 2.5 weight-% lactose. In one embodiment, the milk raw material comprises about 1.2 weight-% to about 1.6 weight-% lactose. In one embodiment, the milk raw material comprises about 1.2 weight-% to about 1.4 weight-% lactose. In one embodiment, the milk raw material having a lactose content of about 0.6 weight-% to about 2.5 weight-%, or any subrange thereof set forth above, is yogurt milk. In one embodiment, the milk raw material having a lactose content of about 0.6 weight-% to about 2.5 weight-%, or any subrange thereof set forth above, is quark milk.

The milk raw material of the present invention comprises protein in an amount of about 2.5 weight-% to about 8 weight-%. In one embodiment the milk raw material comprises protein in an amount of about 3 weight-% to about 5 weight-%. In one embodiment the milk raw material comprises protein in an amount of about 2.5 weight-% to about 4.5 weight-%. In one embodiment the milk raw material comprises protein in an amount of about 3.5 weight-% to about 4.5 weight-%.

In one embodiment, the milk raw material comprises about 0.6 weight-% to about 2.5 weight-%, about 1.0 weight-% to about 2.0 weight-%, about 1.2 weight-% to about 1.6 weight-% or about 1.2 weight-% to about 1.4 weight-% lactose and about 2.5 weight-% to about 8 weight-%, about 3 weight-% to about 5 weight-%, about 2.5 weight-% to about 4.5 weight-%, or about 3.5 weight-% to about 4.5 weight-% protein. As readily understood by those skilled in the art, any combination of these ranges may be employed in selecting the milk raw material to be used. In a specific embodiment, the milk raw material comprises about 1.2 weight-% to about 1.6 weight-% lactose and about 3 weight-% to about 5 weight-% protein. In another specific embodiment, the milk raw material comprises about 1.2 weight-% to about 1.4 weight-% lactose and about 3 weight-% to about 5 weight-% protein.

In one embodiment, the milk raw material having a lactose content of about 0.6 weight-% to about 2.5 weight-%, or any subrange thereof set forth above, is composed of a diafiltered milk protein concentrate. The milk raw material of this embodiment may comprise also cream. The selection of a suitable milk protein concentrate (MPC) belongs to knowledge of a person skilled in the art.

In one embodiment, the milk raw material having a lactose content of about 0.6 weight-% to about 2.5 weight-%, or any subrange thereof set forth above, is composed of a diafiltered milk protein concentrate, which is composed of whey protein and casein protein concentrates. The milk raw material of this embodiment may comprise also cream. The selection of a suitable whey protein concentrate (WPC) and suitable casein protein concentrate belongs to knowledge of a person skilled in the art.

In one embodiment, the milk raw material having a lactose content of about 0.6 weight-% to about 2.5 weight-%, or any subrange thereof set forth above, is composed of a diafiltered ideal whey protein concentrate and a diafiltered ideal casein concentrate. The milk raw material of this embodiment may comprise also cream.

In one embodiment, the milk raw material having a lactose content of about 0.6 weight-% to about 2.5 weight-%, or any subrange thereof set forth above, is composed of an ideal whey protein concentrate and a diafiltered ideal casein concentrate. The milk raw material of this embodiment may comprise also cream.

In one embodiment, the milk raw material having a lactose content of about 0.6 weight-% to about 2.5 weight-%, or any subrange thereof set forth above, is composed of an ideal whey protein concentrate, skim milk, cream and milk minerals.

In one embodiment, the milk raw material having a lactose content of about 0.6 weight-% to about 2.5 weight-%, or any subrange thereof set forth above, is composed of a milk protein concentrate, water and milk minerals. The milk raw material of this embodiment may comprise also cream.

The lactose content of about 0.6 weight-% to about 2.5 weight-%, or any subrange thereof set forth above, of the milk raw material in these embodiments of the invention is the main factor which determines the ratios of different components and which limits the amounts of cream and skim milk or water to be added, if any.

The ideal whey protein concentrate used in the present invention is prepared by microfiltering skim milk and concentrating the obtained microfiltration permeate by ultrafiltration. Accordingly, the ideal whey protein concentrate is an ultrafiltration retentate of the microfiltration permeate of skim milk. The ideal whey protein concentrate is poor in Ca phosphate, the major buffer salt present in milk, which is bound in the casein micelles. Because of this, the acidity of products formulated with whey protein concentrate is lower than the respective products with normal milk protein composition, and thus, the sensation of sweetness in the final product is more promoted. Microfiltration of the skim milk is typically carried out at a temperature of about 2° C. to about 55° C. The ideal whey protein concentrate contains whey proteins about 70-90% and casein about 10-30% of the total milk proteins. Preferably, the ideal whey protein solution contains whey proteins about 80-90%. The ideal whey protein solution contains β-casein, but it contains other casein monomers to a lesser extent than milk. Further, it is free of caseinomacropeptides and thermally formed k-casein β-lactoglobulin complexes. It may contain traces of fat. The protein content of the ideal whey protein solution can range from about 4% to about 25%. The ideal whey protein concentrate has only been exposed to a mild heat treatment and thus the proteins are essentially native. In an embodiment, the protein content of the ideal whey protein solution is about 9%. In one embodiment, the content of β-casein in the ideal whey protein solution is about 20% based on total protein. The lactose content of the ideal whey protein solution can be reduced, if desired. The lactose removal can be accomplished with methods known in the art, such as diafiltration, for example. The ideal whey protein concentrate contains more α-lactalbumin (α-LA) and β-lactoglobulin (β-LG) in total whey protein than WPC or WPI manufactured from cheese whey because the caseinomacropeptide fraction does not exist in ideal whey protein concentrate.

In one embodiment, the ideal whey protein concentrate contains proteins 8.5-9.2% of which 6.4-7.6% are whey proteins and 1.1-2.7% casein (of which about 50-80% is β-casein), lactose 2.4-3.0%, ash 0.48-1.14%, dry matter 11.8-12.7%, sodium 260-310 mg/kg, potassium 1100-1300 mg/kg, calcium 500-580 mg/kg, magnesium 90-110 mg/kg, chloride 320-460 mg/kg, phosphorus 370-460 mg/kg. In one embodiment, the ideal whey protein concentrate contains proteins 8.8% of which 6.9% are whey proteins and 1.7% casein, lactose 2.7%, ash 0.54%, dry matter 12.1%, sodium 300 mg/kg, potassium 1250 mg/kg, calcium 560 mg/kg, magnesium 100 mg/kg, chloride 410 mg/kg, phosphorus 430 mg/kg.

The ideal casein protein concentrate used in the present invention is obtained from milk by a membrane filtration procedure comprising microfiltration, ultrafiltration, nanofiltration, reverse osmosis and/or evaporation. The membrane filtrations, such as ultrafiltration and microfiltration, can be performed with diafiltration technique.

The microfiltration of the milk retains major portion of the casein in retentate whereas a major portion of the whey proteins passes into permeate. The microfiltration is preferably carried out utilizing a uniform transmembrane pressure loop recirculating the retentate through membrane and permeate through permeate site of membrane. Microfiltration of the milk is performed in such a manner that the milk is concentrated by a factor of 1 to 4.5 times by volume, preferably 3.5 to 4.5 times by volume. The concentration factor (cf=K) refers to the ratio of the volume of the liquid fed to the filtration to the retentate, and it is defined with the following formula: K=feed (L)/retentate (L) (L=volume). The concentration factor of ultrafiltration is typically in the range of 1 to 10. In an embodiment, the concentration coefficient is 2 to 5. In one embodiment, the microfiltration is performed in a temperature below 20° C. In another embodiment the microfiltration is performed in a temperature range of 2° C. to 20° C. In a further embodiment the temperature during microfiltration is in the range of 10° C. to 14° C.

The microfiltration may comprise a plurality of microfiltration steps. Different steps may comprise, for instance, changing of process conditions and/or filtration membranes. A variable condition may be, for instance, filtration temperature, filtration pressure, addition of diafiltration medium (diawater), and/or concentration factor of filtration. Conditions can be changed by one or more variables. In the microfiltration comprising a plurality of microfiltration steps, more than one MF permeate and retentate fractions may be formed.

In one embodiment, the ideal casein concentrate is obtained using a combination of microfiltration, ultrafiltration, nanofiltration and reverse osmosis.

Ideal casein protein concentrate comprises casein as the main milk protein component, lactose, calcium ions, phosphate ions and only minor amounts of whey protein. In one embodiment, the ideal casein concentrate contains milk proteins about 9-about 50 weight-%, of which about 8.5-about 50 weight-%, respectfully, are caseins and 0-about 0.5 weight-% are whey proteins. In one embodiment, the casein concentrate contains about 9-about 12 weight-% milk proteins of which 0-about 0.5 weight-% are whey proteins. In a certain embodiment, the casein concentrate contains about 8-about 11 weight-% caseins. In a certain embodiment, the casein concentrate contains about 9.15 weight-% milk proteins of which about 8.5 weight-% are caseins and about 0.2 weight-% are whey proteins. In one embodiment, the ideal casein concentrate contains milk proteins about 9-about 50 weight-%, of which about 8.5-about 50 weight-% are caseins, lactose 0-about 2 weight-%, calcium about 2500-about 12500 mg/kg, phosphorus about 1600-about 8000 mg/kg. In one embodiment, the milk protein content is in the range of about 15-about 30 weight-%, of which about 14.5 about 50 weight-% are caseins. In another embodiment, the calcium content is in the range of about 4000-about 7000 mg/kg, preferably in the range of about 3000-about 5000 mg/kg. In a further embodiment, the calcium content is about 3200 mg/kg. In an even further embodiment, the casein concentrate contains about 9.15 weight-% milk proteins of which about 8.5 weight-% are caseins and about 0.2 weight-% are whey proteins. In a certain embodiment, the membrane filtration of the milk provides an ideal casein concentrate containing milk proteins 9-50 weight-%, of which 8.5-50 weight-% are caseins, lactose 0-0.2 weight-%, calcium 2500-12500 mg/kg, phosphorus 1600-8000 mg/kg. In a certain embodiment, the milk protein content is in the range of 15-30 weight-%, of which 14.5-50 weight-% are caseins. In a certain embodiment, the calcium content is in the range of 4000-7000 mg/kg, preferably in the range of 3000-5000 mg/kg. In a certain embodiment, the calcium content is 3200 mg/kg.

In the context of the present invention, the term "milk" refers to whole milk, low-fat or skim milk, low-lactose or lactose-free milk, or milk reconstituted from milk powder, organic milk or a combination of these. Preferably, the milk is skim milk.

In the context of the present invention, the term "cream" refers to cream having fat content of about 10 to about 40%, protein content of about 1.5 to about 3.5%, and lactose content of about 0 to about 4.5% (w/w).

The composition of the milk minerals of the present invention is typically as follows (% of dry matter):
lactose 2.4 to 50%
sodium 3.5 to 12%
potassium 0.5 to 35%
magnesium 0.1 to 1.5%
calcium 0.1 to 25%
protein 8 to 20%.

The milk minerals can be obtained from milk and whey by different separation techniques including but not limited to chromatographic separation and membrane filtration techniques, e.g. ultrafiltration (UF retentate, UF concentrate, UF permeate), microfiltration (MF retentate, MF permeate), nanofiltration (NF permeate; NF retentate), or reverse osmosis (RO retentate, RO concentrate). Various techniques can be combined in an appropriate manner. The obtained fractions, retentates and/or concentrates can be further concentrated, evaporated and/or dried by using techniques known and accepted in the art. The milk minerals for use in the invention can thus be provided as a concentrate up to powder. In one embodiment, the milk minerals is in the form of a RO retentate. In an embodiment, the milk minerals is used as a liquid concentrate having a dry matter content of about 9% to about 40%. In one embodiment, the milk minerals are as is disclosed in the European patent No. 1061811 B1. The milk minerals can be used to restore the ratio of minerals similar to that of raw milk, which affect both structure formation in acidification and product flavour profile.

In the context of the present invention, the term "sugar sweetener" or "added sugar sweetener" refers to sucrose, fructose, a sucrose containing preparation, a fructose containing preparation or a mixture thereof. In one embodiment, the sugar sweetener is selected from sucrose, fructose, a jam, a fruit/berry concentrate, syrup and/or honey.

In the process of the present invention, the milk raw material having a lactose content of about 0.6 weight-% to about 2.5 weight-%, or any subrange thereof set forth above, is
optionally homogenised,
heat-treated,
acidified,
optionally enzyme-treated,
optionally post-heat-treated,
optionally separated,
optionally treated with a smoothing device,
optionally cooled,
flavoured with a sugar sweetener, and
optionally packed.

In other words, in an embodiment of the present process, the milk raw materials is heat-treated, acidified, and flavoured with a sugar sweetener. Optional process steps include, preferably after the acidification, one or more steps selected from the group consisting of enzyme-treatment, post-heat-treatment, separation, treatment with a smoothing device, and cooling. Alternatively or additionally, the milk raw material may be homogenised prior to the heat-treatment.

In the process of the invention, the milk raw material having a lactose content of about 0.6 weight-% to about 2.5 weight-%, or any subrange thereof set forth above, is homogenized using methods known in the art.

Homogenization may be omitted especially in embodiments, wherein the milk raw material is low-fat or skim milk and/or the milk raw material does not contain any added vitamin D.

In the process of the invention, the milk raw material having a lactose content of about 0.6 weight-% to about 2.5 weight-%, or any subrange thereof set forth above, is heat-treated using methods known per se. Useful heat-treatment processes are, among others, pasteurisation, high-pasteurisation, thermisation, UHT treatment and ESL treatment. Examples of suitable heat-treatments include heating at 80-90° C. for 15 seconds to 10 minutes, UHT treatment at 120-150° C. for 1 to 6 seconds and ESL treatment at 135° C. for 0.5 seconds. The heat-treatment may also be performed in several steps. In one embodiment, the heat treatment is performed also as a post-heat-treatment, specifically as thermisation and/or as pasteurisation for yoghurt or quark.

In the process of the invention, the milk raw material having a lactose content of about 0.6 weight-% to about 2.5 weight-%, or any subrange thereof set forth above, is acidified using methods known in the art. The acidification may be performed by microbiological souring or chemical acidification. Microbiological souring may be performed by utilising biological starters specific to each product (e.g.

bulk starter or direct to vat starter DVI/DVS). For instance, the *Lactobacillus bulgaricus* and *Streptococcus thermophiles* strains are conventionally used in yogurt production. A mesophilic starter (*Lactococcus lactis* ssp. *cremoris, Lactococcus lactis* ssp. *lactis, Leuconostoc mesenteroides* ssp. *cremoris* and/or *Lactococcus lactis* ssp. *diacetylactis*) is typically used in the preparation of quark. When using microbiological souring, it is necessary to make sure that the conditions required by the used starter bacteria are implemented in terms of nutrients, pH and temperature, for instance. Chemical acidification can be performed by using a chemical starter, or organic or inorganic acids. Examples of suitable organic acids include glucono-delta-lactone (GDL), calcium lactate, citric acid, and lactic acid.

In an embodiment, acidification is carried out until pH of about 4.5 to about 4.7, preferably until pH of about 4.5 to about 4.6. In an embodiment, acidification is carried out until pH of about 4.55.

In the process of the invention, an acidified milk material containing lactose derived sugars less than about 2.0 weight-% is provided after the acidification step. In one embodiment, the acidified milk material contains lactose derived sugars from about 0 to 0.6 weight-%.

In the present invention, the term "lactose derived sugars" refers to lactose, glucose and galactose.

In the process of the invention, the milk raw material having a lactose content of about 0.6 weight-% to about 2.5 weight-%, or any subrange thereof set forth above, is optionally enzyme-treated. The enzyme treatment can be done by a protein, a fat and/or a lactose modifying enzyme. The enzyme treatment can be done to the milk raw material and/or to the acidified milk raw material before, during and/or after acidification.

In the process of the invention, the acidified material containing lactose derived sugars less than about 2.0 weight-% or from about 0 to about 0.6 weight-% is optionally cooled. In one embodiment, it is cooled to a temperature of about 15-25° C. In one embodiment, it is cooled to a temperature of about 5 15° C. In one embodiment, there is no cooling step in the process. In one embodiment, the cooling temperature is selected depending on the nature of the biological starter.

In the process of the invention, the acidified material containing lactose derived sugars less than about 2.0 weight-% or from about 0 to about 0.6 weight-% is flavoured with an added sugar sweetener. In one embodiment, the acidified material containing lactose derived sugars less than 2.0% weight-% or from about 0 to about 0.6 weight-% is flavoured with an added sugar sweetener containing preparation. In one embodiment, the added sugar sweetener is sucrose.

The process of the invention may further contain additional optional process steps, such as post-heat-treatment, whey separation (by separation, centrifugation or draining in a sack, to produce quark and whey), treating with smoothing-device and/or a further-processing step in which the material is treated in a manner required by the product being prepared, for instance by adding ingredients, mixing and/or recovering the product in a manner characteristic to it. These optional steps are performed in an appropriate stage of the process known by a person skilled in the art. The process of the present invention may contain a step of final cooling the product to a temperature of about 4 to 6° C. The process of the invention may further contain also packing of the product. The selection of suitable optional steps and conditions belongs to knowledge of a person skilled in the art.

The separation can be effected by a quark separator typically used in the production of quark products. The quark mass can also be separated by ultrafiltration where quark mass is retained in the ultrafiltration retentate and the whey solution is passed through a membrane into a permeate. For example, a plate & frame ultrafiltration apparatus can be used. The separation is carried out under the conditions, such as temperature, commonly used in the preparation of quark.

As is evident to those skilled in the art, any one or more of the abovementioned optional steps may in some embodiments be included in the present process in any combination. Non-limiting examples of such embodiments are set forth below.

In an embodiment of the present process, the milk raw material having a lactose content of about 0.6 weight-% to about 2.5 weight-%, or any subrange thereof set forth above, is
  optionally homogenised,
  heat-treated,
  acidified,
  optionally enzyme-treated,
  optionally post-heat-treated,
  optionally separated,
  optionally treated with a smoothing device,
  optionally cooled,
  flavoured with a sugar sweetener, and
  packed.

In another embodiment of the present process, the milk raw material having a lactose content of about 0.6 weight-% to about 2.5 weight-%, or any subrange thereof set forth above, is
  optionally homogenised,
  heat-treated,
  acidified,
  optionally enzyme-treated,
  optionally post-heat-treated,
  optionally separated,
  optionally treated with a smoothing device,
  cooled,
  flavoured with a sugar sweetener, and
  packed.

In a further embodiment of the present process, the milk raw material having a lactose content of about 0.6 weight-% to about 2.5 weight-%, or any subrange thereof set forth above, is
  homogenised,
  heat-treated,
  acidified,
  optionally enzyme-treated,
  optionally post-heat-treated,
  optionally separated,
  optionally treated with a smoothing device,
  cooled,
  flavoured with a sugar sweetener, and
  packed.

In a still further embodiment of the present process, the milk raw material having a lactose content of about 0.6 weight-% to about 2.5 weight-%, or any subrange thereof set forth above, is
  homogenised,
  heat-treated,
  acidified,
  enzyme-treated,
  optionally post-heat-treated,
  optionally separated,
  optionally treated with a smoothing device,
  cooled,
  flavoured with a sugar sweetener, and
  packed.

In a still further embodiment of the present process, the milk raw material having a lactose content of about 0.6 weight-% to about 2.5 weight-%, or any subrange thereof set forth above, is
homogenised,
heat-treated,
acidified,
enzyme-treated,
post-heat-treated,
separated,
treated with a smoothing device,
cooled,
flavoured with a sugar sweetener, and
packed.

In one embodiment, the process of the invention comprises a step of adding mineral(s), sweetener(s) and/or fibre(s) separately or as a mineral-sweetener-fibre mixture, the mixture containing at least one mineral, at least one sweetener and/or at least one fibre. In one embodiment, the milk raw material contains mineral(s), sweetener(s) and/or fibre(s) separately or as a mineral-sweetener-fibre mixture.

It is also possible to add flavours to the product of the invention. Natural or nature-identical flavours (e.g. lemon, blackcurrant, peppermint) provide the product with various good and tasty flavour combinations.

The process of the invention is simple and suitable for large-scale production.

The process of the present invention may be applied to both batch and continuous production. The process of the invention is preferably done as a batch process.

The invention also relates to a low-sugar acidified milk product in whose production a milk raw material having a lactose content of 0.6 to 2.5 weight-%, or any subrange thereof set forth above, is used.

The invention also relates to a low-sugar acidified milk product comprising less than 8 weight-% sugar. In one embodiment, the low-sugar acidified milk product contains about 6 weight-% sugar. In the context of the present invention, the term "sugar" refers to sugars comprising or consisting of sucrose and lactose derived sugars. In one embodiment, the amount of sucrose of the total sugars in the product is about 70%. In one embodiment, the amount of sucrose of the total sugars in the product is at least 70%. In one embodiment, the amount of sucrose of the total sugars in the product is about 85%. In one embodiment, the amount of sucrose of the total sugars in the product is at least 85%. In one embodiment, the amount of sucrose of the total sugars in the product is about 90%. In one embodiment, the amount of sucrose of the total sugars in the product is at least 90%. In one embodiment, the amount of sucrose of the total sugars in the product is about 70-90%. In one embodiment, the amount of sucrose of the total sugars in the product is about 85-90%. The invention also relates to a low-sugar acidified milk product comprising about 2 to 10 weight-% proteins. In one embodiment, the low-sugar acidified milk product contains about 2 to 8 weight-% proteins. In one embodiment, the low-sugar acidified milk product contains about 3.5 to 5 weight-% proteins. In one embodiment, the low-sugar acidified milk product contains about 2.5 to 4.5 weight-% proteins. In one embodiment, the low-sugar acidified milk product comprises less than 8 weight-% sugar and about 2 to 10 weight-% proteins. In one embodiment, the low-sugar acidified milk product comprises about 6 weight-% sugar and about 2 to 10 weight-% proteins. In one embodiment, the low-sugar acidified milk product comprises about 6 weight-% sugar and about 3.5 to 5 weight-% proteins. Thus, the present invention relates also to a low-sugar acidified milk product having a ratio of lactose derived sugars to protein in the range of 0 to 1.0. In one embodiment the ratio of lactose derived sugars to protein is in the range of 0.1 to 0.5. In one embodiment the ratio of lactose derived sugars to protein is in the range of 0.15 to 0.4.

In one embodiment, the low-sugar acidified milk product is a flavoured acidified milk product. In one embodiment, the acidified milk product is flavoured with a jam. In one embodiment, the acidified milk product is flavoured with fruit(s), aroma preparation(s) and/or juice(s). In one embodiment, the low-sugar acidified milk product is yogurt. In one embodiment, the low-sugar acidified milk product is quark.

The low sugar acidified milk product of the present invention was found to be less acidic and at least equally sweet as a reference product conventionally and having a higher sugar content.

The following examples describe the performance of the invention, but do not restrict the invention to said product embodiments.

Example 1—Sweet Low Sugar Yogurt Using Ultrafiltration

Yogurt milk with residual lactose content of 1.4% and protein content of 3.5% was formulated by mixing:
28% milk protein concentrate (12% protein, 4% lactose) obtained by ultrafiltration of skim milk,
5.6% cream (35% fat),
20% milk minerals on the form of RO retentate,
46.4% water.

Yogurt milk (18 kg) was homogenized at 400 bar and pasteurized at 90° C. for 5 minutes in a pilot pasteurizer. Pasteurized milk (14 kg) was inoculated with a yogurt starter (YFL-706, Chr Hansen) and fermented at 42° C. until pH was 4.55. Yogurt was smoothened with a rotor stator smoothing pump and cooled with a plate cooler to 20° C., after which part of it was packed as white base, a part mixed with liquid sugar (9%), and a part with liquid sugar and low sugar vanilla jam (10%). The total sugar in the flavoured product was 7.0%, and its protein content was 2.9%. The sensory properties are compared to traditional low sugar yogurt having 10% total sugar (reference). The results presented in FIG. 1 show that the present low sugar yogurt is less acidic and at least equally sweet as the reference with higher sugar content. Lower acidity can also be chemically determined by SH (titratable acidity) in Table 1. The reference has a titratable acidity of 34 (pH 4.46 and viscosity 200 mPas). From the results of Table 1 it is also evident that there is no post acidification during storage of 35 days, as both pH and SH remain practically constant. The reference has pH 4.20, SH 38.3 and viscosity 380 mPas.

Example 2—Sweet Low Sugar Yogurt Using Diafiltration

Yogurt milk with residual lactose content of 1.2% and protein content of 3.5% was formulated by mixing:
25.4% casein concentrate (9% protein) obtained by microfiltration and diafiltration of skim milk
6.1% whey protein concentrate (9% protein) obtained by concentration the above permeate
13.7% skim milk
5.7% cream
20% milk minerals
29.1% water Yogurt milk (18 kg) was homogenized at 400 bar and pasteurized at 90° C. for 5 minutes in a pilot pasteurizer.

Pasteurized milk was inoculated with a yogurt starter (YFL-706, Chr Hansen) and fermented at 42° C. until pH was 4.55. Yogurt was smoothened with a rotor stator smoothing pump and cooled with plate cooler to 20° C., after which part of it was packed as white base, a part mixed with liquid sugar (9%), and a part with liquid sugar and low sugar vanilla jam (10%). The total sugar in the flavoured product was 6.8% and its protein content was 2.9%. The sensory properties are compared to traditional low sugar yogurt having 10% total sugar. The results presented in FIG. 1 show that the present low sugar yogurt is less acidic and at least equally sweet as the reference with higher sugar content. Lower acidity can also be chemically determined by SH (titratable acidity) in Table 1. The reference has a titratable acidity of 34. From Table 1, it is also evident that there is no post acidification during storage of 35 days, as both pH and SH remain practically constant.

TABLE 1

|  | Fresh | | | 35 d | | |
| --- | --- | --- | --- | --- | --- | --- |
|  | Viscosity mPas | pH (6-8° C.) | SH | Viscosity mPas | pH (6-8° C.) | SH |
| Example 1 MPC + water (lactose 1.4%) | | | | | | |
| White base | 170 | 4.59 | 24 | 540 | 4.66 | 23.5 |
| White base + sugar | 110 | 4.56 | 21.8 |  | 4.64 | 21.4 |
| White base + sugar + jam | 200 | 4.57 | 19.7 | 280 | 4.64 | 19.0 |
| Example 2 Casein + whey prot. (lactose 1.2%) | | | | | | |
| White base | 450 | 4.68 | 23.7 | 870 | 4.68 | 24.7 |
| White base + sugar | 390 | 4.67 | 21.7 | 680 | 4.65 | 22.4 |
| White base + sugar + jam | 390 | 4.67 | 19.3 | 710 | 4.64 | 19.9 |

Example 3. Lactose-Limiting Fermentation

Yogurt milks with residual lactose content of 0.6-1.2% were formulated by mixing:

Casein concentrate made by microfiltration and diafiltration (protein content 9%) and lactose concentrate (lactose content 18%) made by nanofiltration, diluted with water and milk minerals, obtained with RO (ash content 1.7%).

The final protein content of the yogurt milks were 4% and ash content of 0.3%. Final lactose content for four different yoghurts milks were 0.6%-0.8%1.0%-1.2%. Masses were heat treated in 80-90° C. for 7 min, cooled to 39° C. Yoghurt starter culture was inoculated and fermented at 39° C. to a final pH of 4.6 or until the fermentation reached a stable pH. Packed in 100 ml cups and stored in +6-8° C. for 4 weeks.

Alternatively diafiltered milk protein concentrate (from skim milk) was diluted with water and milk minerals in the form of RO retentate to a final protein content of 4% and ash content of 0.3%. Adjusted with lactose concentrate (lactose content 18%) to a final lactose content of 1.2%.

The reference lactose concentrate was adjusted to 4.5%.

The masses were heat treated in 80-90° C. for 7 min, cooled to 39° C. Yoghurts starter culture was inoculated and fermented in 39° C. to a final pH of 4.6 or until the fermentation reached a stable pH. Packed in 100 ml cups and stored in +6-8° C. for 4 weeks.

Figure 2:
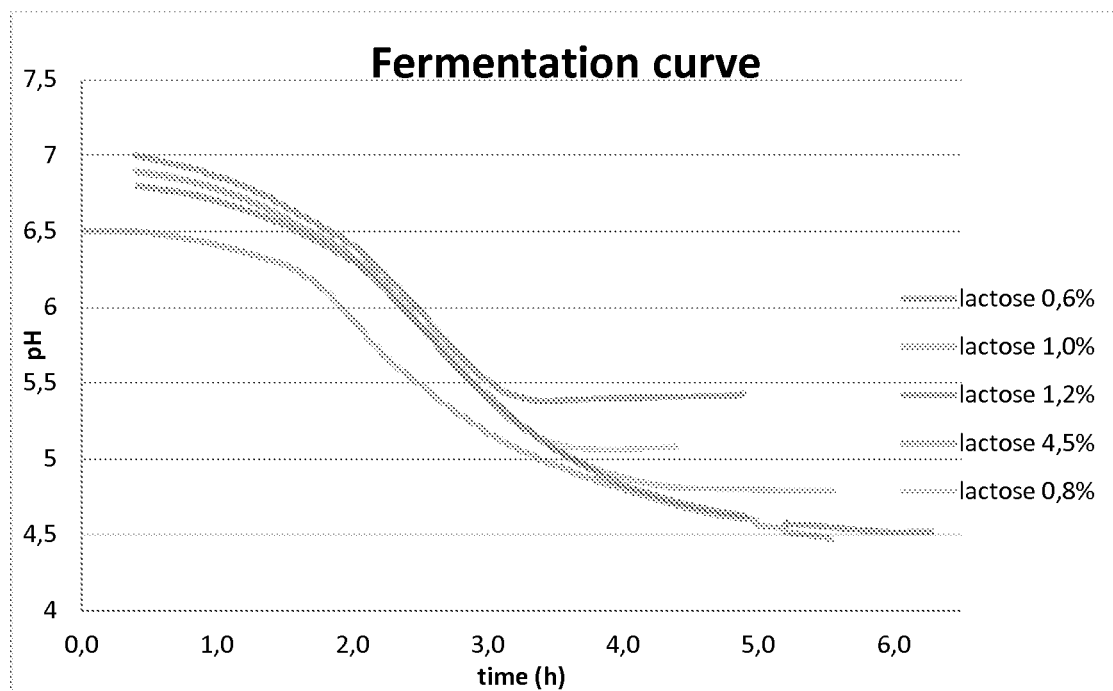
FIG. 2 shows the fermentation speed and kinetics in different lactose concentrations.

Fermentation speed and fermentation kinetics was not slower than reference, shown in FIG. 2. Samples with low lactose content were less acidic than reference and no post acidification occurred during storage of 28 days, as both pH and SH remained constant. The results are presented in Table 2.

TABLE 2

| Lactose % | 0.6 | 0.8 | 1.0 | 1.2 | 4.5* | 1.2* |
| --- | --- | --- | --- | --- | --- | --- |
| ending pH | 5.7 | 5.35 | 4.9 | 4.65 | 4.55 | 4.6 |
| fermentation time | 5 h | 5 h | 55 h | 60 h | 55 h | 55 h |
| pH 1 wk | 5.75 | 5.4 | 4.95 | 4.68 | 4.4* | 4.56 |
| SH 1 wk | 15.6 | 20.7 | 25.9 | 30.5 | 38.1* | 29.4 |
| pH 4 wk | 5.74 | 5.35 | 4.93 | 4.68 | 4.27 | 4.56 |
| SH 4 wk | 15.9 | 21.0 | 26.4 | 29.7 | 41.9 | 29.1 |

*Diafiltered milk protein retentate

Example 4—Sweet Low Sugar Yogurt Using Native Whey Protein Concentrate

Yogurt milk with residual lactose content of 1.2% and protein content of 3.5%, and 50:50 whey protein to casein ratio was formulated by mixing:

- 12.5% casein concentrate (9% protein) obtained by microfiltration and diafiltration of skim milk
- 21.5% whey protein concentrate (9% protein) obtained by concentration the above permeate
- 7% skim milk
- 5.7% cream
- 35% milk minerals in the form of a RO-retentate
- 9.3% water Yogurt milk (18 kg) was homogenized at 400 bar and pasteurized at 90° C. for 5 minutes in a pilot pasteurizer. Pasteurized milk was inoculated with a yoghurt starter (Yo-mix 410, Danisco) and fermented at 42° C. until pH was 4.55. Yoghurt was smoothened with a rotor stator smoothing pump and cooled with plate cooler to 20° C., after which part of it was packed as white base, a part mixed with liquid sugar (9%), and a part with liquid sugar and low sugar vanilla jam (10%). The total sugar in the flavoured product was 6.8% and its protein content was 2.9%. The sensory properties were very similar to traditional low sugar yogurt having 10% total sugar (reference) except for lower acidity. Lower acidity was indicated by SH 22 in the sample as compared with SH 38 in the reference. The viscosities of the products were similar (300 mPas).

Example 5—Carbohydrate-Reduced Sugar-Containing Quark

Quark milk with residual lactose content of 1.4% and 3.5% protein content was formulated by mixing:
- 30% milk protein concentrate (12% protein, 4% lactose) obtained by ultrafiltration of skim milk,
- 20% milk minerals in the form of RO-retentate,
- 50% water.

Quark milk (36 kg) was pasteurized at 86° C. for 7 minutes in a pilot pasteurizer. Pasteurized milk was inoculated with a quark starter (CHN-11, Chr. Hansen) and 0.00035% chymosin (Maxiren 600) was added. Fermentation was carried out at 29° C. for 16 hours until pH was 4.55. Quark was manually mixed, thermisized at 62° C. for 2 minutes, and concentrated by ultrafiltration at 50° C. (UF Koch Nadir UH030, 30 kDa, 12 membranes) to 11%, cooled in a water bath, mixed with jam (10% dosing; 46% sucrose) and packed in cups. The filtration permeate was analysed for residual lactose derived sugars, and the total content of these was below 1%. Flavoured quark was milder in acidity as compared with the commercial product and at least as sweet-tasting. The total sugar content of the product was 5.2% as compared with the commercial product with 9%.

Example 6—Different Starter Cultures in Low-Lactose Fermentation

Commercial starter cultures Yo-mix 209 (Danisco), YoFlex Creamy 1.0 (Chr Hansen), YFL-706 (Chr Hansen), Yo-mix 410 (Danisco), and YoFlex Premium (Chr Hansen) were studied in low-lactose fermentation conditions of Examples 1, 2 and 4. Fermentation time and final pH are presented in Table 3.

The difference in end pH-values demonstrates the different abilities of the starter cultures to ferment lactose-derived sugars. The strains, which do not use galactose efficiently, are limited at higher pH-values. The different ratio of milk proteins between examples 4 and 2 results in difference in buffering capacity of the milk bases (colloidal mineral are associated with casein) and thus, less lactic acid needed to decrease the pH to certain level. Therefore, the amount of lactose in the milk base depends on both the buffering capacity and the starter cultures used to ferment it.

TABLE 3

| Milk base | Starter culture | Final pH | Fermentation time |
| --- | --- | --- | --- |
| As in Example 4 | Yo-mix 209 | 4.53 | 4 h 20 min |
| As in Example 4 | YoFlex Creamy 1.0 | 4.46 | 4 h 5 min |
| As in Example 4 | YFL-706 | 4.55 | 3 h 25 min |
| As in Example 2 | YoFlex Creamy 1.0 | 4.55 | 3 h 15 min |
| As in Example 2 | Yo-mix 410 | 4.64 | 4 h 25 min |
| As in Example 2 | YoFlex Premium | 4.69 | 4 h 30 min |
| As in Example 1 | YFL-706 | 4.62 | 5 h |
| As in Example 2 | YFL-706 | 4.63 | 5 h 15 min |

The invention claimed is:

1. A process for the preparation of a low sugar acidified milk product, wherein a milk raw material having a lactose content in the range about 0.6 weight-% to 2.5 weight-% and protein in an amount of about 2.5 to 8 weight-% is used as a starting material, wherein the starting material is
   heat treated,
   acidified with a biological starter to a pH of about 4.5 to 4.7, and
   flavoured with a sugar sweetener selected from sucrose, fructose, a sucrose containing preparation, a fructose containing preparation, or a mixture thereof, after the starting material is acidified, to provide a low sugar acidified milk product,
   wherein the low sugar acidified milk product has a sugar content of about 6 weight-% to less than 8 weight-%.

2. The process as claimed in claim 1, wherein the lactose content of the milk raw material is in the range about 1.0 weight-% to about 2 weight-%.

3. The process as claimed in claim 1, wherein the lactose content of the milk raw material is in the range about 1.2 weight-% to about 1.6 weight-%.

4. The process as claimed in claim 1, wherein the lactose content of the milk raw material is in the range about 1.2 weight-% to 1.4 weight-%.

5. The process as claimed in claim 1, wherein the milk raw material comprises protein in an amount of about 3 to about 5 weight-%.

6. The process as claimed in claim 1, wherein the milk raw material comprises protein in an amount of about 3.5 to about 4.5 weight-%.

7. The process as claimed in claim 1, wherein the milk raw material comprises protein in an amount of about 2.5 to about 4.5 weight-%.

8. The process of claim 1, wherein the milk raw material is composed of a diafiltered milk protein concentrate and optionally of cream.

9. The process of claim 8, wherein the diafiltered milk protein concentrate is composed of a whey protein concentrate and a casein protein concentrate.

10. The process of claim 1, wherein the milk raw material is composed of a diafiltered ideal whey protein concentrate and a diafiltered casein concentrate and optionally of cream.

11. The process of claim 1, wherein the milk raw material is composed of a whey protein concentrate, a diafiltered casein concentrate and optionally cream.

12. The process of claim 1, wherein the milk raw material is composed of a whey protein concentrate, skim milk, cream and milk minerals.

13. The process of claim 1, wherein the milk raw material is composed of a milk protein concentrate, water, milk minerals and optionally cream.

14. The process of claim 1, wherein the milk raw material is yogurt milk or quark milk.

15. The process of claim 1, wherein the acidification is carried out until pH of about 4.5 to about 4.6.

16. The process of claim 1, wherein the milk raw material is homogenised prior to the heat-treatment.

17. The process of claim 1, wherein the milk raw material after acidification is further enzyme-treated, post-heat-treated, separated, treated with a smoothing device, and/or cooled.

18. A low sugar acidified milk product produced according to claim 1.

19. The low sugar acidified milk product according to claim 18, wherein the product comprises
   about 6 weight-% to less than 8 weight-% sugar, of which at least 70%, at least 85% or at least 90% is sucrose, and
   about 2 to 10 weight-% proteins.

20. The process of claim 1, wherein the low sugar acidified milk product has a sugar content of about 6 weight-%.

21. A low-sugar acidified milk product, which comprises
   about 6 weight-% to less than 8 weight-% sugar, of which at least 70%, at least 85% or at least 90% is sucrose,
   about 2 to 10 weight-% proteins,
   a ratio of lactose derived sugars to protein from about 0.1 to 1, and
   a pH of about 4.5 to about 4.7.

22. The low sugar acidified milk product according to claim 21, in whose production a milk raw material having a lactose content of 0.6 to 2.5 weight-% is used.

23. The low-sugar acidified milk product according to claim 21, wherein the product is yogurt or quark.

24. The low sugar acidified milk product of claim 21, wherein the low sugar acidified milk product has a sugar content of about 6 weight-%.

\* \* \* \* \*